US012754950B2

(12) United States Patent
Adeel et al.

(10) Patent No.: US 12,754,950 B2
(45) Date of Patent: Oct. 6, 2026

(54) USING AN ASSET BUCKET FOR CORRELATING ASSETS

(71) Applicants: Getac Technology Corporation, New Taipei City (TW); WHP Workflow Solutions, Inc., North Charleston, SC (US)

(72) Inventors: Muhammad Adeel, Edina, MN (US); Thomas Guzik, Edina, MN (US)

(73) Assignees: Getac Technology Corporation, New Taipei City (TW); WHP Workflow Solutions, Inc., North Charleston, SC (US)

( * ) Notice: Subject to any disclaimer, the term of this patent is extended or adjusted under 35 U.S.C. 154(b) by 0 days.

(21) Appl. No.: 19/091,681

(22) Filed: Mar. 26, 2025

(65) Prior Publication Data

US 2025/0225174 A1 Jul. 10, 2025

Related U.S. Application Data

(63) Continuation of application No. 18/111,389, filed on Feb. 17, 2023, now Pat. No. 12,277,164.

(51) Int. Cl.
*G06F 16/00* (2019.01)
*G06F 3/0482* (2013.01)
(Continued)

(52) U.S. Cl.
CPC ............ *G06F 16/44* (2019.01); *G06F 3/0482* (2013.01); *G06F 3/0486* (2013.01); *G06F 16/45* (2019.01)

(58) Field of Classification Search
CPC ...... G06F 16/44; G06F 3/0482; G06F 3/0486; G06F 16/45
See application file for complete search history.

(56) References Cited

U.S. PATENT DOCUMENTS

| | | | | |
|---|---|---|---|---|
| 6,028,602 | A * | 2/2000 | Weidenfeller ........ | G06F 3/0481 715/781 |
| 8,719,867 | B2 * | 5/2014 | Scott ...................... | H04N 21/84 715/810 |

(Continued)

FOREIGN PATENT DOCUMENTS

| | | | |
|---|---|---|---|
| JP | 2010-176714 | A | 8/2010 |
| KR | 10-2010-0029077 | A | 3/2010 |

(Continued)

*Primary Examiner* — Alexander Khong
(74) *Attorney, Agent, or Firm* — Finnegan, Henderson, Farabow, Garrett & Dunner, LLP

(57) ABSTRACT

This disclosure describes techniques for implementing an asset bucket on user devices for organizing assets in a database. Assets may include, without limitation, stored multimedia data from various sources, grouped multimedia data, events, conditions, parameters, environmental data, and other data or telemetry data that are stored in a network operating center (NOC) server database or a third-party database. The asset bucket may include a persistent working space that can be rendered as a pane on a device's user interface for organizing assets that can be selected from a rendered window or windows on the device's user interface and/or directly inputted on the persistent working space. By configuring the asset bucket to facilitate performance of actions on the selected assets, the asset bucket may improve generation of reports on these selected assets.

20 Claims, 9 Drawing Sheets

100

(51) Int. Cl.

| | |
|---|---|
| ***G06F 3/0486*** | (2013.01) |
| ***G06F 16/44*** | (2019.01) |
| ***G06F 16/45*** | (2019.01) |

(56) References Cited

U.S. PATENT DOCUMENTS

| | | | | |
|---|---|---|---|---|
| 9,043,329 | B1 * | 5/2015 | Patton | G06Q 10/40 707/740 |
| 9,507,506 | B2 * | 11/2016 | Grosz | H04N 1/00177 |
| 9,881,612 | B2 | 1/2018 | Guzik | |
| 10,620,973 | B1 * | 4/2020 | Gailloux | G06F 9/451 |
| 11,615,630 | B1 * | 3/2023 | Brousseau | G01S 19/51 382/104 |
| 2006/0064429 | A1 * | 3/2006 | Yao | G06Q 30/02 |
| 2006/0195475 | A1 * | 8/2006 | Logan | G06F 16/58 |
| 2008/0036917 | A1 * | 2/2008 | Pascarella | H04N 21/235 725/42 |
| 2008/0155627 | A1 * | 6/2008 | O'Connor | H04N 21/84 348/E7.069 |
| 2010/0159966 | A1 * | 6/2010 | Friedman | G06F 3/0482 715/769 |
| 2010/0199189 | A1 * | 8/2010 | Ben-Aroya | G06F 16/24568 709/224 |
| 2012/0300974 | A1 * | 11/2012 | Rodriguez | H04N 1/32122 382/100 |
| 2014/0324500 | A1 * | 10/2014 | Ptak | G06Q 10/063116 705/7.16 |
| 2015/0186497 | A1 * | 7/2015 | Patton | G06F 16/27 707/740 |
| 2017/0220668 | A1 * | 8/2017 | Patton | H03F 1/3247 |
| 2019/0324826 | A1 * | 10/2019 | Abuelata | G06F 3/048 |
| 2021/0055885 | A1 * | 2/2021 | Strathman | G06F 3/0604 |
| 2021/0258300 | A1 * | 8/2021 | Eriksson | H04L 9/3228 |
| 2023/0350549 | A1 * | 11/2023 | Gottstein | G06F 3/0481 |
| 2023/0421732 | A1 * | 12/2023 | Tal | G06F 16/29 |
| 2024/0005277 | A1 * | 1/2024 | Demmer | G06Q 10/103 |

FOREIGN PATENT DOCUMENTS

| | | | |
|---|---|---|---|
| KR | 10-2016-0093289 | A | 8/2016 |
| KR | 10-2021-0004638 | A | 1/2021 |

* cited by examiner

100

USING AN ASSET BUCKET FOR CORRELATING ASSETS

CROSS REFERENCE TO RELATED APPLICATIONS

This application is a continuation of U.S. application Ser. No. 18/111,389, filed Feb. 17, 2023, the contents of which is incorporated herein by reference in its entirety.

BACKGROUND

Law enforcement agencies provide officers and agents with an assortment of devices—electronic and otherwise—to carry out duties required of a law enforcement officer. Such devices include radios (in-vehicle and portable), body-worn cameras, weapons (guns, Tasers, clubs, etc.), portable computers, and the like. In addition, vehicles such as cars, motorcycles, bicycles, may be equipped with electronic devices associated with the vehicle, such as vehicle cameras, sirens, beacon lights, spotlights, and personal computers.

It is increasingly common for law enforcement agencies to require officers to activate cameras (body-worn and vehicle-mounted) that enable officers to capture audio and/or video contents of incidents in which an officer is involved. This provides a way to preserve evidence, that would otherwise be unavailable, for subsequent legal proceedings. This evidence greatly aids in the investigation of criminal activities, identification of perpetrators of crimes, and an examination of allegations of police misconduct, to name a few advantages.

It is also desirable to further investigate the incidents or generate a report based on the captured audio and/or video contents. In a network environment setting where hundreds of different devices from different places can capture audio and/or video contents, there is a need to improve management of stored audio, video contents, and other captured data.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
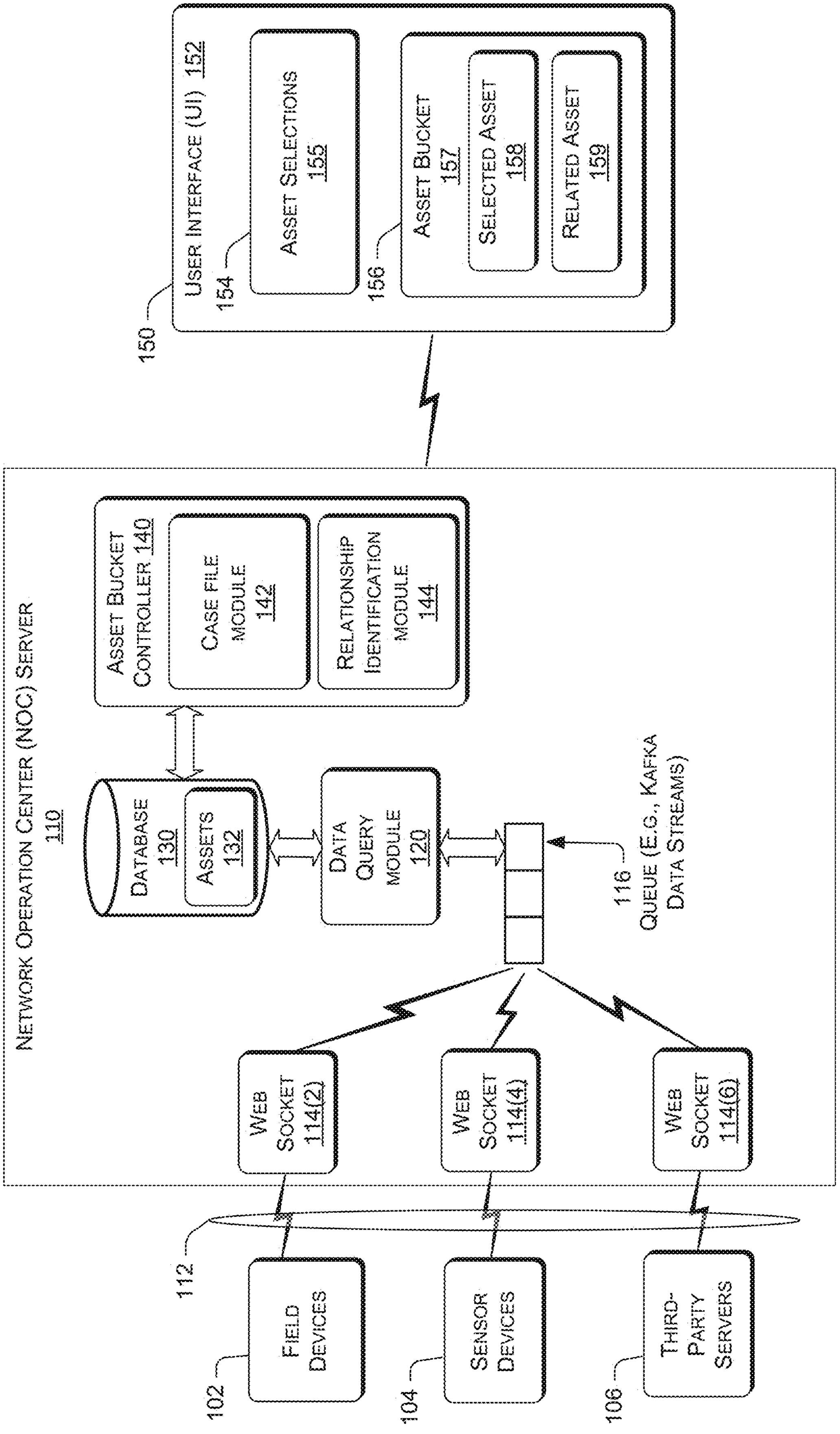
FIG. 1 illustrates an example architecture that implements an asset bucket for processing assets that can be selected and retrieved from a database or received from other sources, in accordance with at least one embodiment.

This disclosure is directed to techniques for implementing an asset bucket on user devices for organizing assets. Assets may include, without limitation, stored multimedia data from various sources, grouped multimedia data, events, conditions, parameters, environmental data, and other data or telemetry data that are stored in a network operating center (NOC) server database or a third-party database. The asset bucket may represent a persistent working space that can be rendered as a window or pane on a device's user interface for organizing assets that can be selected from other rendered windows or panes on the device's user interface. By configuring the asset bucket to facilitate performance of actions on the selected assets, the asset bucket may improve generation of reports on these selected assets.

For example, a user device may display one or more windows and/or panes. A window may include a directory of stored assets while a pane, being representative of an asset bucket, may present a persistent working space. The asset bucket may be a floating pane, i.e., a pane that can be displayed so as to overlay the display beneath. In this example, one or more stored assets from the window may be selected and processed in the pane. An output from processing actions or operations performed in the asset bucket may be saved as a case file, used to update an existing case file, or used in the processing of another case file or selected asset(s). The case file, for example, may include a case identification and associated information such as actions performed with respect to a selected asset. The actions, for example, may include searching for related assets, editing the selected asset, placing an annotation on the selected asset, and the like.

It is noted that, although the following description describes details particularly relating to law enforcement assets, the techniques described herein can be applied to a number of different scenarios. For example, the techniques may be applied in the context of a store owner, an office accountant, a student working on different files at the same time, etc. Basically, the techniques described below can be applied in the processing of a variety of assets from different windows or panes, thereby positively impacting presentation of data from various sources in various formats.

As used herein, the terms "device," "portable device," "electronic device," and "portable electronic device" may indicate similar items and may be used interchangeably without affecting the meaning of the context in which they are used. Further, although the terms are used herein in relation to devices associated with law enforcement, it is noted that the subject matter described herein may be applied in other contexts as well, such as in a security system that utilizes multiple cameras and other devices.

The implementation and operations described herein may be ascribed to a server; however, alternative implementations may execute certain operations in conjunction with or wholly within a different element or system component(s). Further, the techniques described herein may be implemented in a number of contexts, and several example implementations and context are provided with reference to the following figures. The term "techniques," as used herein, may refer to system(s), method(s), computer-readable instruction(s), module(s) m algorithms, hardware logic, and/or operation(s) as permitted by the context described above and throughout the document.

Example Architecture

FIG. 1 illustrates an example architecture 100 that implements an asset bucket for processing assets that can be selected and retrieved from a database or received from other sources, in accordance with at least one embodiment. Assets may include the likes of stored multimedia from various sources, events, conditions, parameters, environmental data, or data that can be retrieved from a network operating center (NOC) server database or third-party database. The asset bucket may present as a persistent workspace pane that can be used to perform actions or operations with respect to one or more assets from one or more other panes or other windows, such as another folder, browser, a window showing real-time data, and the like. The workspace, for example, may include a rendered user interface pane where a user can preview selected assets, drag additional assets from another pane or window, or directly input assets by entering text or a link to a location in a database of assets or other source of assets. The actions or operations may include, without limitation, an adding of an annotation to the selected assets, correlating the selected assets to a stored asset or group of assets, linking a dragged asset with a browser link, etc.

In some embodiments, the user may have open at the same time the asset bucket and one or more other panes or windows on the device user interface. For example, the user interface may render the asset bucket as a pane, empty in the absence of assets, while another pane or window is rendered as a directory of assets. Here, the user may use the rendered asset bucket to perform actions on assets that can be selected from other panes or windows. By configuring the asset bucket as an independent persistent pane, evidence gathering, report creation, and/or documentation of field operations may be efficiently performed. As described herein, "persistent" may indicate that the selected asset and/or processing in the asset bucket is not deleted, unless deliberately deleted by the user and/or the performed action. "Persistent" may also refer to the status of the asset bucket remaining accessible and able to support ongoing processing even if minimized or if the user were to navigate away from it.

As shown, the architecture 100 may include one or more field devices 102, one or more sensor devices 104, and/or one or more third-party servers 106. The field devices 102 may include video, audio, or multimedia recording devices that record video and/or audio. Audio data, video data, environmental data, events, sensor data, and other real-time or stored data may be also referred to herein as assets. The field devices 102 may include recording devices that are worn on the bodies of LEOs or attached to equipment such as motor vehicles, personal transporters, bicycles, etc., used by the LEOs. For example, an LEO that is on foot patrol may be wearing a body camera. In another example, a patrol vehicle may be equipped with a fixed laptop, and so on.

The sensor devices 104 may detect characteristics of an environment at a geolocation or in proximity of the geolocation of the field device 102. In one embodiment, the sensor devices 104 may be integrated with the field device 102. In another embodiment, the sensor devices 104 may be standalone devices from different locations. In one example, the sensor devices 104 may include an accelerometer, a gyroscope, a GPS receiver, a barometer, an ambient light sensor, a compass, a gravity sensor, a proximity sensor, and/or any other similar sensors. In this example, the sensor data captured by the sensor devices 104 may also be referred to as assets.

The third-party servers 106 may include remote servers that can provide environmental data associated with an event or sensor data captured by the field devices 102, the sensor devices 104, or other sources. In one embodiment, a third party server 106 may provide environmental data associated with the geolocation of a device present at a real-time incident. In this embodiment, the geolocation of the device may be correlated in the third party server 106 with the geolocation of a real time incident. In some instances, the environmental data may include third party news reports, social media posting, weather reports, or the like, which describe the disposition of a surrounding environment and real time events that are occurring proximate to the current geolocation of the portable recording device. The environmental data may also be referred to as assets. Accordingly, the assets may include, without limitation, data captured by the field devices 102, sensor devices 104, and/or data that can be retrieved from the third-party servers 106.

In one embodiment, the field devices 102, sensor devices 104, and third-party servers may be connected to a NOC server 110 through a network 112. The NOC server 110 may be part of a facility that can be operated by a law enforcement agency or a third party that supports operations of the law enforcement agency. The NOC server 110 may include web sockets 114(2)-114(8), a receiving queue 116, data query module 120, a database 130 that stores queried data as assets 132, and an asset bucket controller 140, which further includes a case file module 142 and a relationship identification module 144. The NOC server 110 may further establish wired or wireless communications with a user device 150, which can also be a field device.

In an implementation, the user device 150 may include a user interface 152, which may be configured to display a window 154 and a pane 156. The window 154 may display a folder or an asset directory that can show asset selections 155 while the pane 156 may display an asset bucket 157. The asset bucket 157 may represent the persistent working space or rendered pane for viewing and/or processing the selected assets as described herein. The asset bucket 157 may further include a selected asset 158, and a related asset 159. One window 154 and one pane 156 are shown for illustration purposes. However, multiple other windows and/or panes may be rendered to display various assets from different sources or additional asset buckets for processing of the selected assets from the different sources.

Each one of the web-sockets 114(2)-114(6) may include an endpoint of a two-way communication link between two programs running on the network 112. The endpoint may include an Internet Protocol (IP) address and a port number that can function as a destination address of the web-socket. Each one of the web-sockets 114(2)-114(6) may be bound to the IP address and the port number to enable entities such as the field device 102, sensor devices 104, and third-party servers 106 to communicate with the NOC server 110 via the web socket. In one example, the web-sockets 114(2)-114(6) may be set up to receive data streams from the field device 102, sensor devices 104, and third-party servers 106, respectively. The received data streams may be pushed to the receiving queue 116 before they can be decoupled and stored in the database 130 as assets 132. In one example, the decoupled data streams may be initially transformed to conform with a schema structure (not shown) of the database 130 and then stored as assets 132 in the database 130. The schema structure of the assets 132 may include data fields that support data formats of the field devices 102, sensor devices 104, and third-party servers 106.

The queue 116 may include management software that processes the received data streams from the web-sockets 114(2)-114(6). The queue 116 may be implemented, for example, by an event streaming platform that supports a publish-subscribe based durable messaging system. The event streaming platform may receive data streams and store the received data streams as topics (not shown). A topic may include an ordered collection of events that are stored in a durable manner. The topic may be divided into a number of partitions that can store these events in an unchangeable sequence. In this case, the event streaming platform may receive the data streams, store these data streams as topics, and different applications may subscribe to receive these topics in the event streaming platform. The subscription to receive the data streams (topics) may be based upon a time period (e.g., within a certain time range or frequency) or upon detection of an event.

In one example, a plurality of data streams from the web sockets 114 are pushed into the queue 116 and stored as topics. Given a situation that the database 130 subscribed to receive these topics, then the data selection module 120 may decouple the associated data streams that can include a detected event. For example, the detected event may include streaming videos and images that were uploaded by a law enforcement officer's camera. In this example, the database 130 may receive this event via the data selection module 120 and store the decoupled event as assets 132. The stored assets 132 may include a header, associated source or device ID, timestamps, and the like.

Asset bucket controller 140 may include an application that can process the assets that were selected and retrieved from the database 130 or other sources. The asset bucket controller 140 may also facilitate transmission of the processed assets to the user device 150 for further action or in response to a request from the user. In one embodiment, the asset bucket controller 140 may monitor activity in the pane 156 that is associated with the asset bucket 157. The monitoring may occur continuously, per a predetermined schedule, or in response to a triggering event.

Continuous monitoring occurs after the user (e.g., law enforcement officer) opens the asset bucket 157 to view a file, record, history, and/or any other items in the asset bucket 157 and/or the asset selections 155. Monitoring per a predetermined schedule may correspond to a monitoring activity occurring at any time interval, such as one minute, five minutes, 20 minutes, 30 minutes, or one hour. Monitoring in response to a triggering event may correspond to the monitoring occurring in response to receipt of an activity in the asset bucket 157. For example, the user drags an asset from the asset selections 155 to the asset bucket 157. Here, the detected input or activity in the asset bucket 157 may trigger the monitoring of activity by the asset bucket controller 140. In another example, the user may open a multimedia in the asset selections 155 or directly input a link in the selected asset 158. Here, the detected input or activity in the asset bucket may trigger the monitoring of activity by the asset bucket controller 140.

Case file module 142 may support creation of a new case file, integration of the new case file to another case file, or updating of an old case file. The case file may include a heading, identification of the selected or related assets, actions performed on these assets, configurations of the assets after the performance of the actions, and/or other information related to performance of the actions on the selected assets and/or related assets. In one example, the configurations of the assets after the performance of the actions may include a shortened length of recorded video, annotated audio, and the like.

Relationship identification module 144 may identify a relationship between assets and particularly, the assets that are related to the selected asset 158 in the asset bucket 157. The selected asset 158 may include the one or more selected assets that can be subjected to one or more actions in the asset bucket 157. The actions may include, without limitation, correlating the selected asset with other assets based on geolocation proximity, associating the correlated assets to a group of assets, and the like. For example, the user drags an audio data (asset) from the asset selections 155 onto the asset bucket 157. Here, the input audio data may be treated as the selected asset 158. In this example, the relationship identification module 144 may correlate the other assets in the database to the selected asset 158 based on geographic proximity, temporal proximity, object recognition, matching identifiers, or other suitable factors. In some embodiments, the relationship identification module 144 may use predetermined thresholds when determining the related assets on account of geolocation proximity, temporal proximity, and the like.

In some embodiments, the relationship identification module 144 may include computer-executable instructions to implement pre-defined or user-defined rules that relate to processing of the selected asset 158. The pre-defined rules may be representative of the actions that can be performed on the selected asset 158. For example, a rule may facilitate tagging a determined related asset to the selected asset 158. In another example, a rule may facilitate integrating the related asset to the selected asset 158. In another example, a rule may indicate an event that can trigger the monitoring of the asset bucket, and so on. In a context of law enforcement investigation or documentation, these rules may facilitate viewing of the selected assets, monitoring of related assets, performing an action on the selected assets or related assets, and the like, without altering configuration of the assets in panes other than the asset bucket.

The user device 150 may include or be embodied by a cellular phone, a smart phone, a session initiation protocol (SIP) phone, a laptop, a personal digital assistant (PDA), a satellite radio, a global positioning system, a multimedia device, a video device, a camera, a game console, a tablet, a smart device, a wearable device, or any other similar functioning device. In some embodiments, the user device 150 may be used by the LEO to manage the stored assets 132 in the database 130. In other embodiments, the user device 150 may be used to link real-time data that can be directly captured by the user device 150 or accessed from other sources such as the browser window. These assets and real-time data may be selected to undergo further actions or processing as described herein.

The user interface 152 of the user device 150 may display one or more floating panes, browsing windows, and/or folders such as the window 154. In one embodiment, the window 154 may display or render the asset selections 155 that can include the assets 132 from the database 130, real-time data that can be directly captured by the user device 150, or data that can be received by the user device 150 from other sources such as data from a browsed application. In this embodiment, one or more assets in the asset selections 155 may be dragged onto the pane 156 as selected asset 158. The asset selection may then trigger rendering of the related asset 159.

As described herein, the asset bucket controller 140 may monitor this activity of inputting a selected asset and correspondingly provide the related asset 159 that can be displayed in the pane 156. The asset bucket controller 140 may further support the actions that will be taken on the selected asset 158. For example, the actions may include integrating the selected asset with the related asset 159, creating a new case file or group for the selected asset 158, editing the selected asset 158 for presentation as evidence in a trial proceeding, and the like.

Example User Interface

Figure 2:
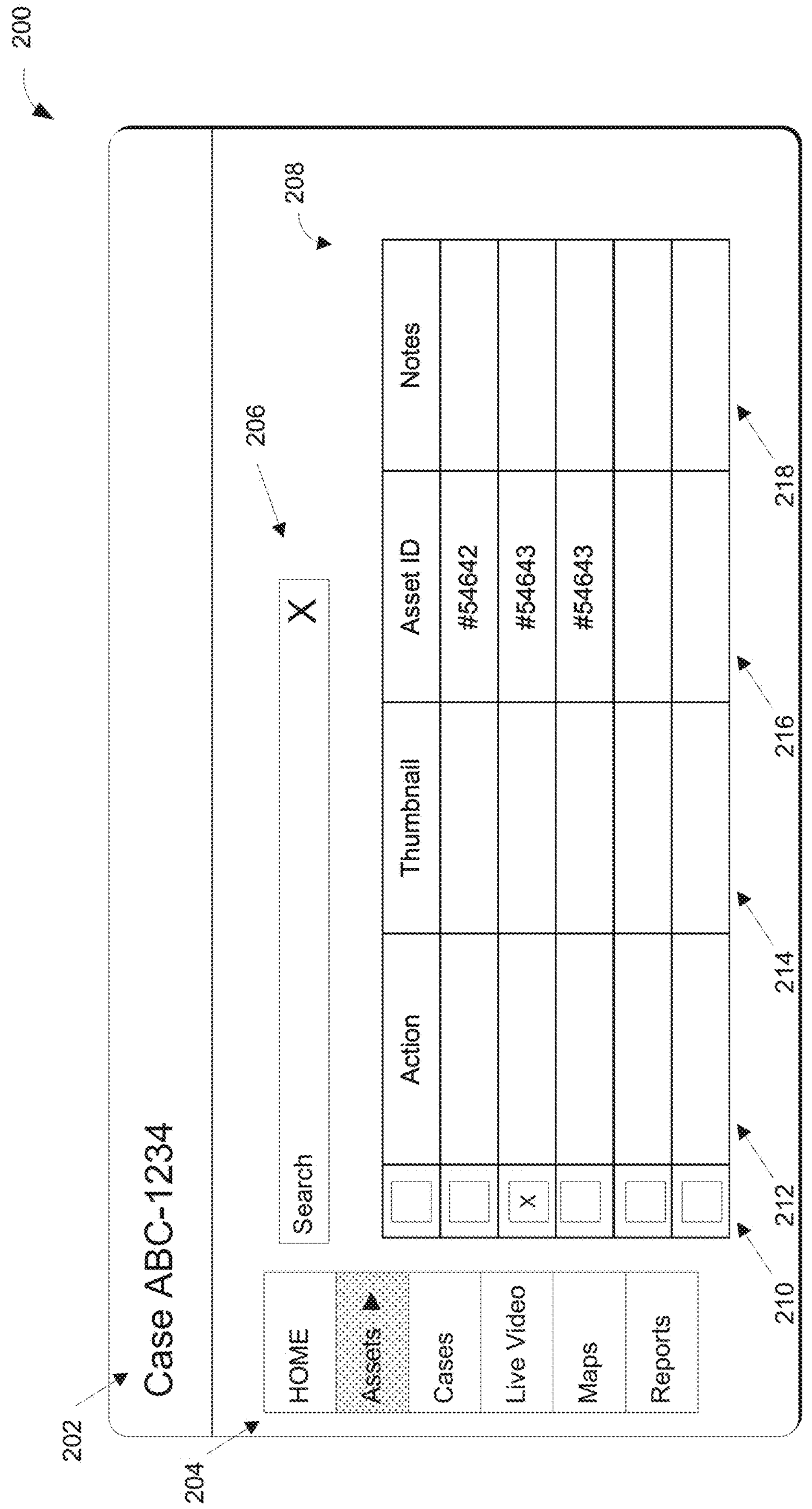
FIG. 2 illustrates an example user interface that shows assets available for viewing and analysis by a user.

FIG. 2 illustrates an example user interface 200 that shows assets available for viewing and analysis by a user. By way of illustration, the user interface 200 may present the title of a case or event 202 for which assets are generated or associated. A menu 204 may include a home button and other buttons or links, some of which may act as filters to different window information such as a listing of assets available to the user for viewing, cases for which a listing of assets may be generated and/or displayed, live video assets only, maps pertinent to the case or event 202, and/or reports that have been previously opened or generated with respect to the case or event 202. In addition, the user interface may present a search box 206 by which a user may search for a cases, assets, or other information. A variety of information may be presented, for example in a table 208, based on a selection made via the menu 204. The elements of the user interface 200 should not be considered limiting. Within the context of this disclosure, a variety of information may be presented via the user interface 200. Certain information, however, such as identification of the assets, may be especially useful in carrying out at least some of the teachings herein.

In FIG. 2, assets have been selected via the menu 204 as indicated by a shaded background. The assets are presented in the table 208, one asset per row, although no there is no limit on the format of presentation. As an example of columns that may form at least part of the table and show features related to the assets, FIG. 2 shows columns 210, 212, 214, 216, and 218 of row (asset) selection, actions to be performed relative to a row selection, thumbnails of the assets, asset identifiers (IDs), and notes related to the assets, respectively.

Figure 3:
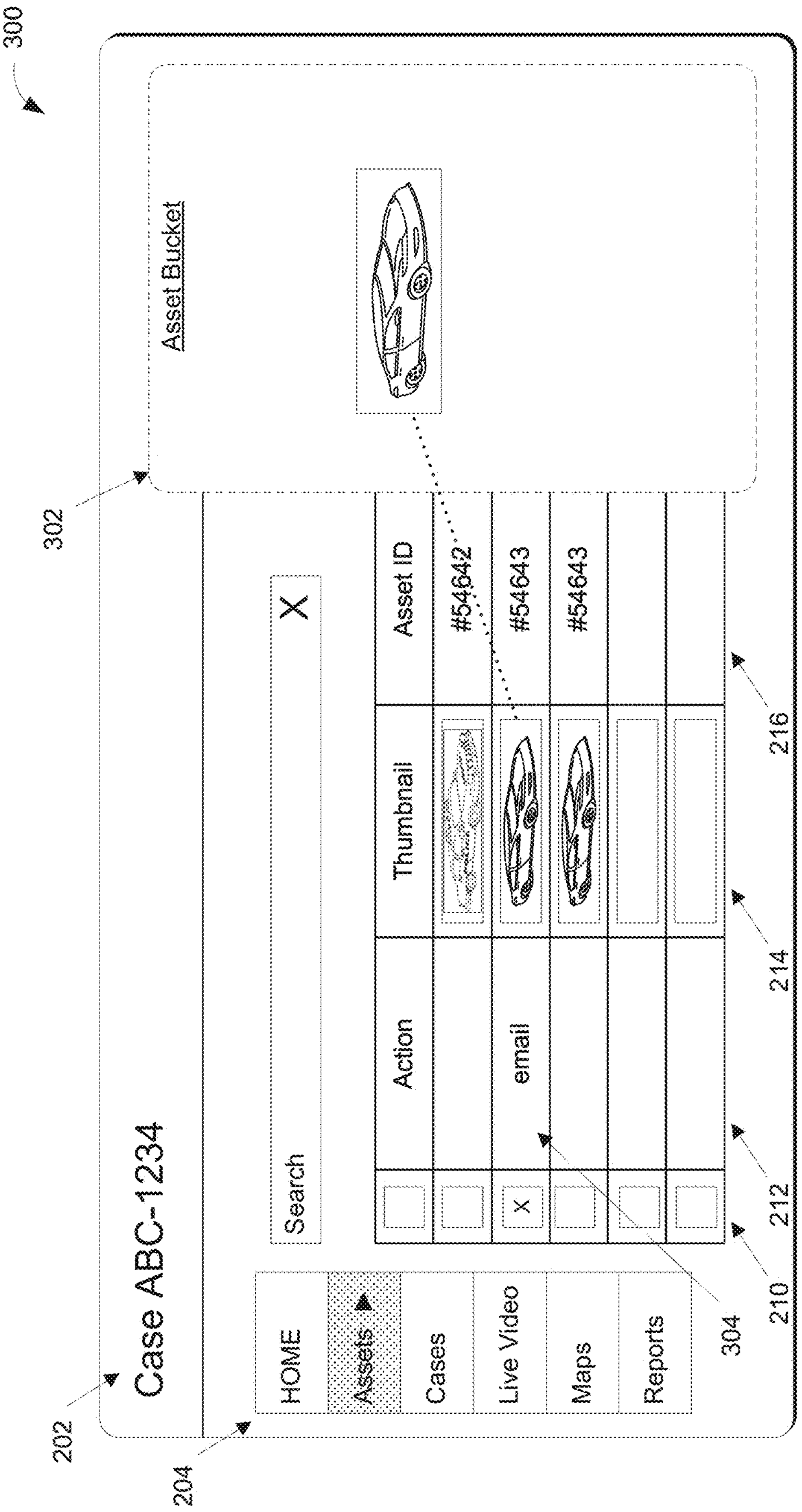
FIG. 3 illustrates an example user interface that shows an example of using as asset bucket as a workspace for performing various gatherings, collections, categorizations, and/or groupings of assets.

FIG. 3 illustrates an example user interface 300 that shows an example of using as asset bucket 302 as a workspace for performing various gatherings, collections, categorizations, and/or groupings of assets. The asset bucket 302 may be generated by selecting the asset button in the menu 204, although other provisions, such as a dedicated button, may be incorporated. In some embodiments, a variety of actions may be performed with respect to assets added to the asset bucket 302. For example, as shown at 304, an asset #54643 may be selected, e.g., by checking a box in the column 210 that is in the same row. In some embodiments, the asset #54643 may be selected and pasted into the asset bucket 302. An action may then be performed with respect to the selected asset #54643. In the illustrated example, the action "email" may be input, e.g., via a dropdown menu. In addition, or in the alternative, the asset #54643 may be moved into the asset bucket 302 by drag-and-drop. In accordance with moving the asset #54643 to the asset bucket 302 and inputting "email" into the action column, information about the asset #54643 may be emailed to a recipient. For example, on inputting "email" into the action column in the selected row, a window may open for emailing the asset information as an attachment. Other examples of actions are described elsewhere herein.

Figure 4:
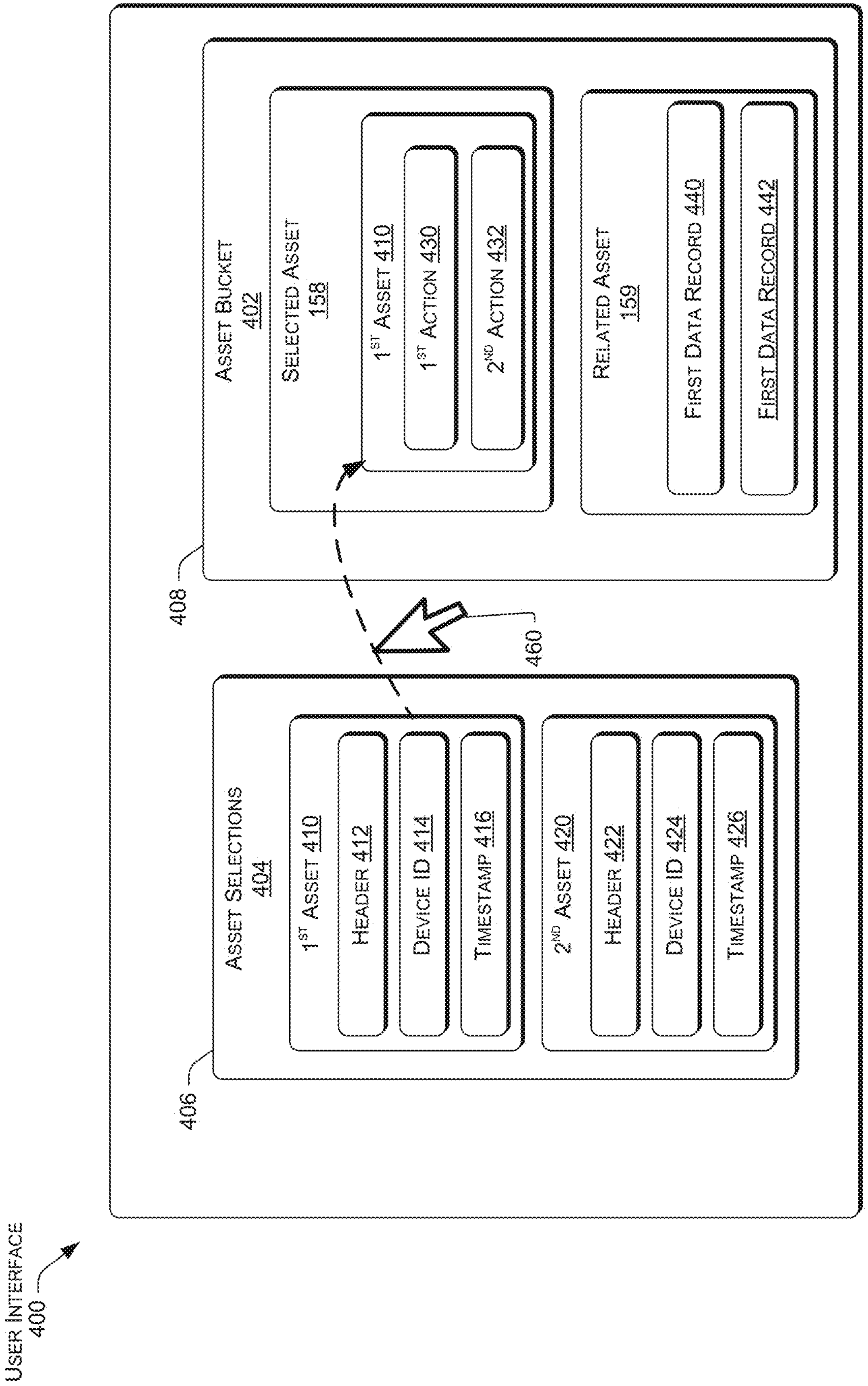
FIG. 4 is a block diagram of an example configuration that can render an asset bucket for processing one or more asset selections.

FIG. 4 is a block diagram of an example configuration that can render an asset bucket 402 for processing one or more asset selections 404. The asset bucket 402 may correspond to the asset bucket 157 or the asset bucket 302. The asset selections 404 may correspond to the asset selections 155 or the selected asset #54643, for example. For illustration purposes, the user interface 400 may include a configuration 406 corresponding to the window 154 and a configuration 408 corresponding to the pane 156. The window 154, for example, may include a browser window or a folder pane that shows the assets in the database or other sources. The pane 156 may include, for example, the asset bucket 402 that includes the persistent working space for performing one or more actions on the one or more selected assets 158. The one or more actions on the one or more selected assets 158 may be supported by the asset bucket controller 140. Particularly, the asset bucket controller 140 may implement pre-configured rules or user-defined rules to support the actions associated with monitored activities on the user interface 400. In some cases, the actions may be performed in response to a particular user request.

In one example, the configuration 406 may include hardware and/or software configured to perform operations that include causing a display of the asset selections 404 such as a first asset 410 and a second asset 420. The first asset 410 may be associated with a header 412, device ID 414, and a timestamp 416. The second asset 420 may be associated with a header 422, device ID 424, and a timestamp 426. Each of the first asset 410 or the second asset 420 may include, without limitation, a stored event, audio recording, video recording, a multimedia that includes audio and video recording, an environmental data from a third-party server, a link, or any other data that can be retrieved from the database or other sources. The other sources can be third-party servers or the user device that is associated with the user interface 400, for example.

The header 412, 422 of the asset may include, for example, the name of the asset or identification of the data streams such as a number of bytes. The device ID 414, 424 of the asset may include the source of the asset or the identification of the field device or sensor device that captured the asset. The timestamp 416, 426 of the asset may include a time when the asset was captured, received, or a combination of both. Other information associated with the asset such as geolocation, size of the asset, status such as original data or updated data, and the like, may also be included in the first asset 410 and the second asset 420.

In one embodiment, the configuration 408 may include hardware and/or software configured to perform operations that include causing a display of the asset bucket 402. In some cases, the asset bucket 402 may also be referred to as an asset bucket window or asset bucket pane. The asset bucket 402 may include the selected asset 158 and the related asset 159, which can be rendered as separate sub-windows within the asset bucket 402. The selected asset 158 may include a sub-window or sub-pane that is associated with a corresponding identifier to distinguish it from the sub-window or sub-pane that shows the related asset 159, for example. Here, the asset bucket controller 140 may use these sub-window identifiers to monitor and detect the activity in the selected asset 158, related asset 159, or in the asset bucket 402 in general.

For example, a user may use a cursor 460 to drag the first asset 410 from the asset selections 404 using the configuration 406 from the window 154 to the asset bucket 402. In this example, the dragging onto the asset bucket 402 and particularly, on the selected asset 158 may trigger an event that can be detected and used by the asset bucket controller 140 to run the corresponding rules. The rules may define actions that correspond to the monitored activities, event, or user request. Such rules may be pre-set in a NOC server or may be user-defined. In one example, the rule may include the use of a geolocation threshold when a received user request includes searching of the related assets based on the geolocation of the selected asset. In another example, the rule may include the use of a temporal threshold when a received user request includes searching of the related assets based on the timestamp that is associated with the selected asset, and so on.

An output of the performed actions that can be defined by the rules may be presented as a first data record 440 and a second data record 442 in the related asset 159. The first data record 440 may be representative of an output of the performed actions to indicate the one or more assets that are identified to be related to the first asset 410 based on a particular feature of the first asset 410. For example, the particular feature may include a geolocation proximity of the one or more assets to the geolocation of the selected first asset 410, and the second data record 442 may be representative of an output of the performed actions to indicate the one or more assets that are identified to be related to the first asset 410 based on another feature of the first asset 410. For example, the other features may include temporal proximity of the one or more assets to the timestamp associated with the first asset 410.

With the first asset 410 dragged onto the selected asset 158, the user may perform, for example, a first action 430 and/or a second action 432. In some embodiments, the first action 430 may be representative of a pre-configured rule or a user-defined rule that can be implemented on the selected first asset 410. For example, the first action 430 may include editing a total length of a video as the first asset 410 from its original version length of two hours to edited version length of one hour.

The second action 432 may be representative of another pre-configured rule or user-defined rule that can be implemented on the selected first asset 410. For example, the second action 432 may include placing an annotation on the first asset 410. In another example, the second action 432 may include integrating the first data record 440 to the selected first asset 410, linking a website or application, and so on.

After performing the first action 430 and/or the second action 432, the processed asset 410 may be stored as a case file in the database, forwarded to another third-party server, communicated to another user device, and/or a combination thereof.

In other embodiments, the hovering of the cursor 460 on the second asset 420 may trigger another action that can be defined by another rule as described herein. For example, when the user hovers the cursor 460 onto a sub-window that renders the second asset 420, the related asset 159 may display the information associated with the second asset 420. The information may include the header 422, device ID 424, and/or the timestamp 426.

Example Implementation—Determining Related Assets

Figure 5:
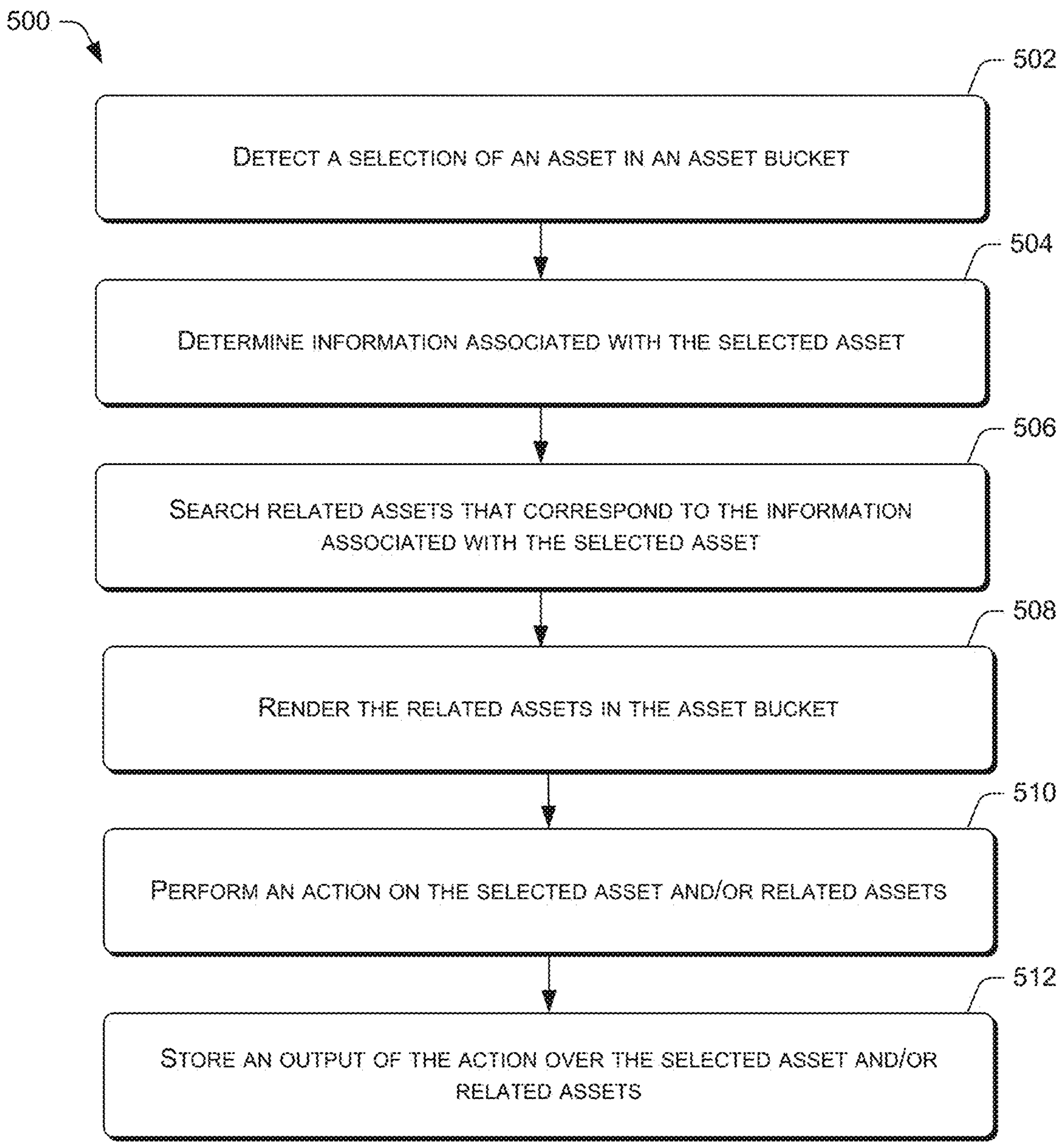
FIG. 5 is a flow diagram that depicts a methodological implementation of at least one aspect of the techniques for determining the one or more assets that are related to the selected asset as described herein.

FIG. 5 is a flow diagram 500 that depicts a methodological implementation of at least one aspect of the techniques for determining the one or more assets that are related to the selected asset as described herein. In the following discussion of FIG. 5, continuing reference is made to the elements and reference numerals shown in and described with respect to the NOC server 110 of FIG. 1. Further, certain operations may be ascribed to particular system elements shown in previous figures. However, alternative implementations may execute certain operations in conjunction with or wholly within a different element or component of the system(s). Furthermore, to the extent that certain operations are described in a particular order, it is noted that some operations may be implemented in a different order to produce similar results.

At block 502, the NOC server 110 and particularly, the asset bucket controller 140 may detect a selection of an asset in an asset bucket. In one instance, the selection of an asset may include dragging of an asset from a window to a pane that is associated with the asset bucket. In this instance, the window may include a folder or directory of stored assets, a browser window, or a window that includes assets from third-party servers, and the pane may be a floating pane that represents the asset bucket. The selection of the asset may include entering into the asset bucket a link, file name, title, or other information that can be used to identify the selected asset. Here, the asset bucket controller 140 may monitor activities in the asset bucket and the window that can include asset selections such as the asset selection 155 of FIG. 1.

At block 504, the asset bucket controller 140 may determine information associated with the selected asset. For example, the information may include the header of the selected asset, device ID, geolocation, timestamp or range of times associated with the selected asset, or any other suitable information about the selected asset.

At block 506, the asset bucket controller 140 may search related assets that correspond to the information associated with the selected asset. As further described in FIGS. 6-8 below, the asset bucket controller 140 may use rules that can define the geolocation proximity, temporal proximity, or a combination thereof, to search for the related assets. In one example, the related assets may include a first data record such as the first data record 440 in FIG. 4. Here, the first data record 440 may include assets that can be determined to be related to the selected asset based on a particular threshold such as geolocation threshold. In another example, the related assets may also include a second data record such as the second data record 442 in FIG. 4. Here, the second data record 442 may include assets that can be determined to be related to the selected asset based on another threshold such as temporal threshold.

At block 508, the asset bucket controller 140 may render the searched related assets in the asset bucket. For example, the searched related assets may be represented by the first data record 440 and the second data record 442 as shown in FIG. 4.

At block 510, the asset bucket controller 140 may perform an action on the selected asset and/or the related assets. In some embodiments, the action may be performed in response to a request from the user or in response to a monitored event that can trigger performance of a corresponding action. Here, the asset bucket controller 140 may include computer-executable instructions to implement pre-defined or user-defined rules that relate to processing of the selected asset and/or related assets. The pre-defined rules or user-defined rules may define the actions that can be performed on the selected asset. For example, a rule may facilitate tagging a determined related asset to the selected asset 158. In another example, a rule may facilitate integrating the related asset to the selected asset 158. In another example, a rule may indicate an event that can trigger the monitoring of the asset bucket, and so on.

At block 512, the asset bucket controller 140 may store an output of the action over the selected asset and/or the related assets. In one example, the output of the actions may be represented by a case file in the case file module 142. The case file may include a heading, identification of the selected or related assets, actions performed on these assets, configurations of the assets after the performance of the actions, and/or other information related to performance of the actions on the selected assets and/or related assets. In one example, the configurations of the assets after the performance of the actions may include a shortened length of recorded video, annotated audio, and the like. Here, the case file module 142 may support creation of a new case file, integration of the new case file to another case file, and/or updating of an old case file that is associated with the performed actions.

Figure 6:
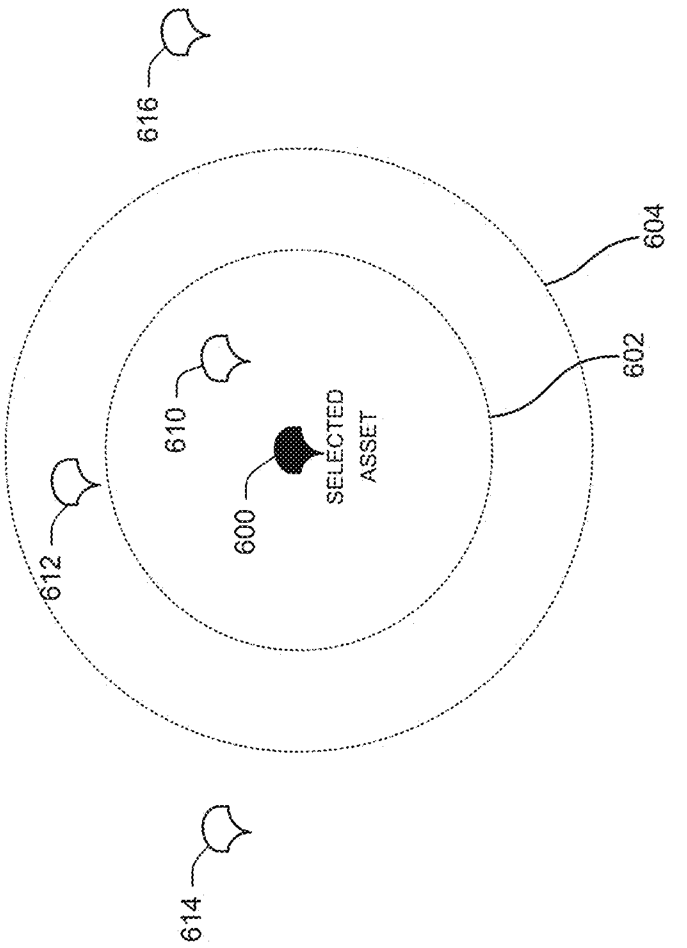
FIG. 6 depicts an example embodiment for identifying one or more assets that are related to a selected asset based on geolocation proximity of the one or more assets to the selected asset.
Figure 7:
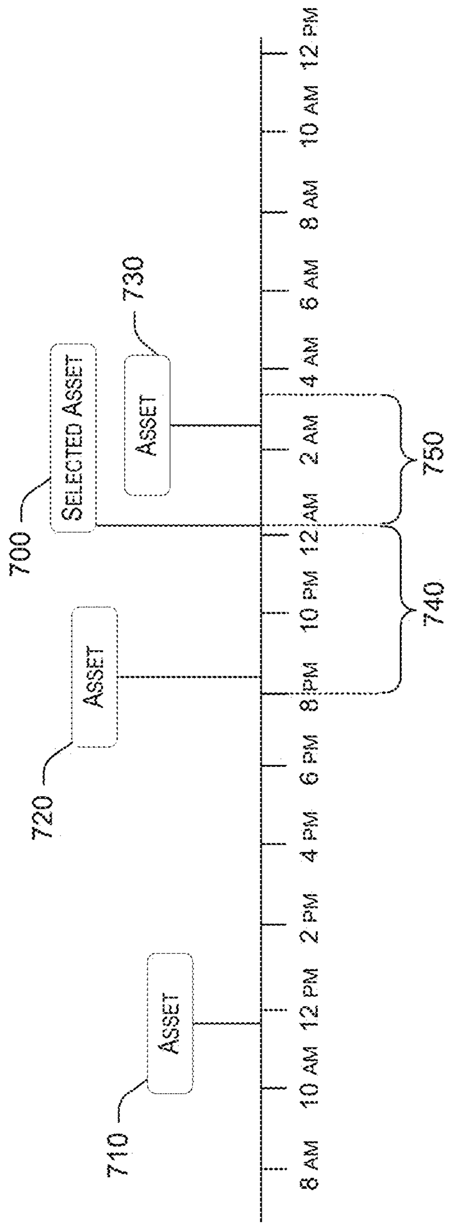
FIG. 7 depicts an example embodiment for an additional filtering of the assets that were initially identified to be related to the selected asset based on their corresponding geographical proximity (also referred to as geolocation proximity).

FIGS. 6 and 7 illustrate example embodiments of searching for the related assets based on different thresholds as may be defined by the rules in the NOC server 110 in FIG. 1.

FIG. 6 depicts an example embodiment for identifying one or more assets that are related to a selected asset based on geolocation proximity of the one or more assets to the selected asset. In one embodiment, an asset selection window such as the asset selections 155 in FIG. 1 may include assets 600, 610, 612, 614, and 616. As depicted in FIG. 6, the asset 600 is dragged, for example, from the asset selection window to the user interface window that is associated with the asset bucket as described herein. Accordingly, in the illustrated example, the asset 600 may be treated as the selected asset while the assets 610-616 may be treated as non-selected assets.

In some embodiments, the asset bucket controller 140 may use a geolocation threshold such as a first geolocation threshold 602 and a second geolocation threshold 604 to identify assets that are geographically related to the selected asset 600. In one example, the first geolocation threshold 602 and the second geolocation threshold 604 may include predetermined radius to identify the assets that are related to the selected asset 600. In this example, the asset bucket controller 140 may implement pre-defined rules or user-defined rules that are associated with the use of the predetermined radius.

In one embodiment, the asset bucket controller 140 may identify the geolocation information that is associated with the selected asset 600 and use the preconfigured geolocation thresholds to identify non-selected assets or assets from other sources (not shown) that can be related to the selected asset 600. In some embodiments, these geolocation thresholds may be dynamically adjusted based on context of identification of the related assets. By way of illustration, consider that the selected asset 600 involves an assault at a particular geolocation, time, and captured by a particular field device. Here, multiple geolocation thresholds may be applied to determine a relevance of the assets to the selected asset 600. In one instance, each of the geolocation thresholds may be determined based on an amount of time that has elapsed, which can be measured from the timestamp associated with the selected asset.

For example, the asset 610 may include a geolocation information that is located within the first geolocation threshold 602, the asset 612 may include a geolocation information that is located within the second geolocation threshold 604, while the assets 614 and 616 may include corresponding geolocation information that are located outside the second geolocation threshold 604. Upon identification of the corresponding geolocations of the assets 610-616, the asset bucket controller 140 may present the asset 610 as the first data record such as the first data record 440 in FIG. 4. Similarly, the asset bucket controller 140 may present the asset 612 as the second data record such as the second data record 442 in FIG. 4. In some cases, the asset bucket controller 140 may present the assets 614 and 616 as non-related assets that can be used for future reference by the user.

FIG. 7 depicts an example embodiment for an additional filtering of the assets that were initially identified to be related to the selected asset based on their corresponding geographical proximity (also referred to as geolocation proximity). Particularly, FIG. 7 shows the filtering of the number of the initially identified related assets based on their temporal proximity to the selected asset.

As shown, a selected asset 700 may be determined to be associated with a first related asset 710, second related asset 720, and third related asset 730 based on the corresponding geolocation proximity of these assets to the geolocation of the selected asset 700. The selected asset 700 may include an asset dragged onto the asset bucket, manually entered by the user, retrieved from an inputted link, and/or the like. As illustrated, only three related assets are presented in FIG. 7; however, there may be thousands of related assets that can be associated with the selected asset 700 based on geographical proximity. Further, a type or nature of the selected asset and the related assets may be different. For example, the selected asset is related to an event or act such as an assault while the related assets may include evidentiary matters such as captured audio, video, or a combination thereof, in the vicinity of the location of the assault. In other examples, the related assets may include environmental data and/or sensor data.

In one embodiment, the asset bucket controller 140 may identify the timestamp information associated with the selected asset 700 and use the preconfigured temporal thresholds to further filter the first related asset 710, second related asset 720, and third related asset 730. In some embodiments, these temporal thresholds may be dynamically adjusted based on context of identification of these related assets. By way of illustration, consider that the selected asset 700 involves an assault at a particular geolocation, time, and captured by a particular field device. Here, multiple temporal thresholds may be applied to further filter the first related asset 710, second related asset 720, and third related asset 720.

For example, a first temporal threshold 740 may include a range to identify the related assets that may have occurred before the assault while a second temporal threshold may include another range to identify the related assets after the commission of the assault. In this example, the second related asset 720, which is related to the selected asset 700 based on the first temporal threshold 740, may be presented as the first data record such as the first data record 440 in the asset bucket 402 of FIG. 4. Similarly, the third related asset 730, which is related to the selected asset 700 based on the second temporal threshold 750, may be presented as the second data record such as the second data record 244242 in the asset bucket 402 of FIG. 4. In some embodiments, the depicted first related asset 710 may be presented as unrelated asset for future reference. Accordingly, the use of dynamic multiple thresholds may be implemented to further filter the initially selected related assets based on a particular threshold.

Example NOC Server

Figure 8:
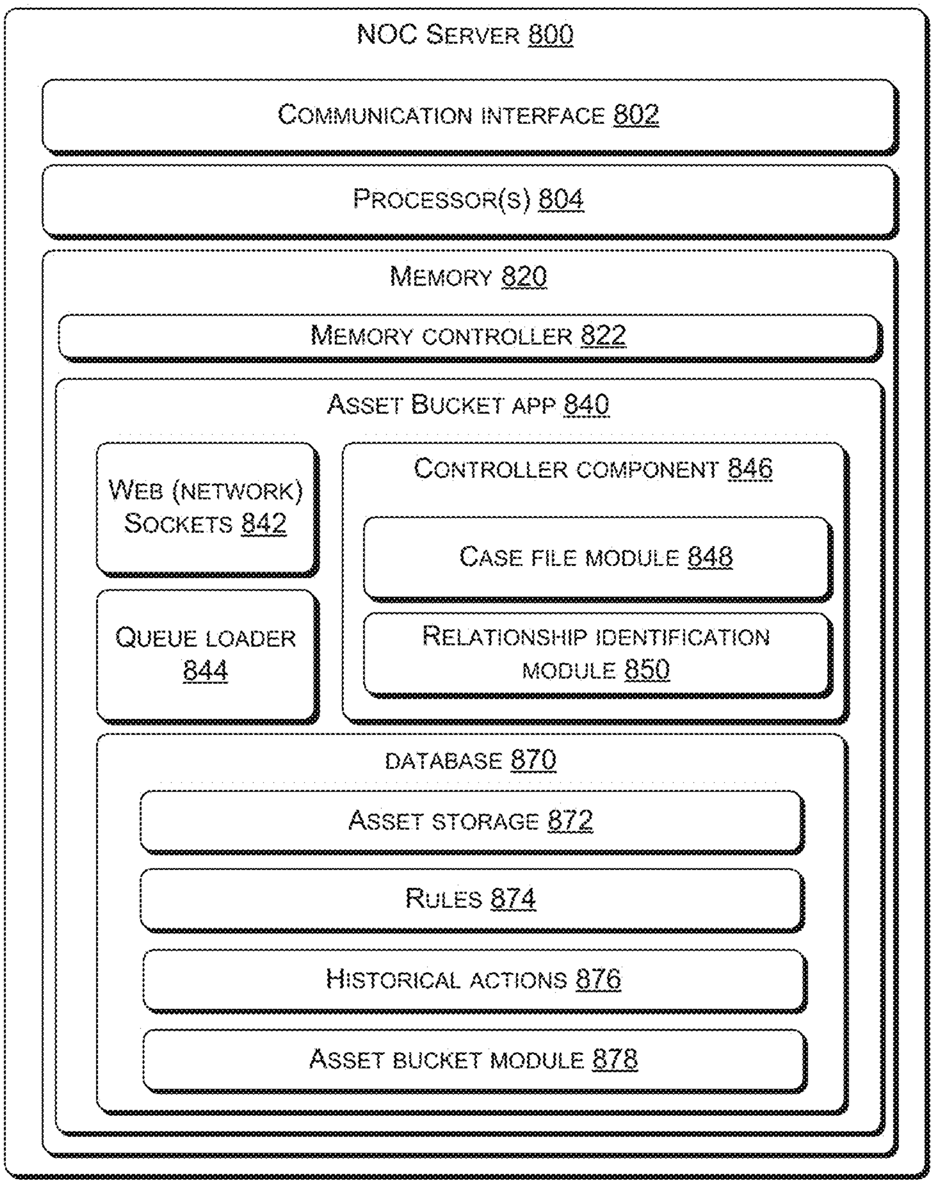
FIG. 8 is a diagram of an example NOC server that may implement the asset bucket as described herein.

FIG. 8 is a diagram of an example NOC server 800 that may implement the asset bucket as described herein. The NOC server 800 may be similar to the NOC server 110 of FIG. 1 and may include a computer system that implements deployment of the field devices and sensor data to capture the assets that can be rendered in the asset selections and/or the asset bucket as described herein.

The NOC server 800 may include a communication interface 802 to facilitate communication with data sources such as the field devices 102, sensor devices 104, and the third-party servers 106. Communication between the NOC server 800 and other electronic devices may utilize various communication protocols for sending and receiving data and/or voice communications.

The NOC server 800 includes a processor 804 having electronic circuitry that executes instruction code segments by performing basic arithmetic, logical, control, memory, and input/output (I/O) operations specified by the instruction code. The processor 804 can be a product that is commercially available through companies such as Intel® or AMD®, or it can be one that is customized to work with and control a particular system. The processor 804 may be coupled to other hardware components used to carry out device operations. The other hardware components may include one or more user interface hardware components not shown individually—such as a keyboard, a mouse, a display, a microphone, a camera, and/or the like—that support user interaction with the NOC server 800.

The NOC server 800 may also include memory 820 to store data, executable instructions, modules, components, data structures, etc. The memory 820 may be implemented using computer-readable media. Computer-readable media includes, at least, two types of computer-readable media, namely computer-readable storage media and communications media. Computer-readable storage media includes, but is not limited to, Random Access Memory (RAM), Dynamic Random Access Memory (DRAM), Read-Only Memory (ROM), Electrically Erasable Programmable Read-Only Memory (EEPROM), flash memory or other memory technology, Compact Disc-Read-Only Memory (CD-ROM), digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. As defined herein, computer-readable storage media do not consist of and are not formed exclusively by modulated data signals, such as a carrier wave. In contrast, communication media may embody computer-readable instructions, data structures, program modules, or other data in a modulated data signal, such as a carrier wave, or other transmission mechanisms.

A memory controller 822 may be stored in the memory 820 of the NOC server 800. The memory controller 822 may include hardware, software, or a combination thereof, that enables the memory 820 to interact with the communication interface 802, processor 804, and other components of the NOC server 800. For example, the memory controller 822 receives assets (e.g., audio and video contents) from the communication interface 802 and sends the received assets to an asset bucket app 840 for further processing. In another example, the memory controller 822 may retrieve the assets from memory 820 where the assets can be processed in the processor 804.

The memory 820 stores the asset bucket app 840 that, when executed, implements the identification of the windows on the user interface, monitoring of user activities in the asset bucket, performing of actions that correspond to the monitored activities, rendering an output of the performed action in the asset bucket, and/or storing a case file that can represent the output of the performed actions in the asset bucket.

As shown, the asset bucket app 840 may include a network or web-sockets 842, a queue loader 844, a controller component 846 with a case file module 848 and a relationship identification module 850, and a database 870. The database 870 may further include an asset storage 872, rules 874, historical actions 876, and an asset bucket module 878. In one example, each component of the asset bucket app 840 can be realized in hardware, software, or a combination thereof. For example, the controller component 846 is a combination of hardware and software module that is tied to the database 870 to control the related assets that will be rendered in the asset bucket and/or sub-windows or subpanes that are associated with the asset bucket. The case file module 848, relationship identification module 850, and the database 870 are similar to the case file module 142, relationship identification module 144, and the database 130 of FIG. 1.

The web-sockets 842 may be similar to web-sockets 114(2)-114(6) of FIG. 1. The web-sockets 842 may be implemented by a software module designed to establish communications with the field devices 102, sensor devices 104, and third-party servers 106, respectively. In one example, each one of the web-sockets 114(2)-114(6) is bound to the IP address and the port number to communicate with the corresponding devices.

In one example, the queue loader 844 may include an application programming interface (API) to establish a connection with the event streaming platform such as the Apache Kafka™. The event streaming platform may utilize logs to store the data streams from the media recording devices. The logs are immutable records of things or events. The logs may include topics and partitions to store the data streams. In one example, the NOC server 800 may subscribe to the topics in the event streaming platform and utilize the queue loader 844 to decouple the data streams that the NOC server 800 has subscribed to receive. The decoupled data streams are then stored in the asset storage 872 of the database 870.

The controller component 846 may be similar to the asset bucket controller 140 of FIG. 1. In one example, the controller component 846 may monitor the activities of the user, perform an action based on the monitored activities, or render the assets that may be determined to be related to the selected asset as described herein. The activities of the user may include dragging and releasing an asset to the asset bucket window, adding of a link, annotation, category, and/or classification to the selected asset, hovering a cursor over different asset thumbnails in the asset selections 155, searching of assets that are related to the selected asset, and so on.

The controller component 846 may utilize the relationship identification module 848 in generating the related asset that can be rendered on the asset bucket. For example, the relationship identification module 850 may search for the one or more assets that are related to the selected asset. In this example, the controller component 846 may use the rules 874 when searching for the one or more assets that are related to the selected asset.

Rules 874 may define actions that correspond to the monitored activities in the one or more windows and/or panes in the user interface. The rules 874 may also define the actions that correspond to a user request, detection of a triggering event, and the like. Such rules may be pre-set in the NOC server 800 or may be user-defined. In one example, the rules 874 may include the use of a geolocation threshold when a received user request includes searching of the related assets based on the geolocation of the selected asset. In another example, the rules 874 may include the use of a temporal threshold when a received user request includes searching of the related assets based on the timestamp that is associated with the selected asset. In another example, the rules 874 may define the temporary showing of audio or video contents as the user hovers over different asset selection thumbnails in the asset selections 155. In another example, the rules 874 may define the integration of the related asset to the selected asset when the related asset is dragged to the selected asset sub-window. In another example, the rule 874 may define a deletion of the related asset when the related asset is dragged away from the asset bucket window, and so on.

Historical actions 876 may include previous actions that were performed on the selected asset and/or related assets. In some embodiments, the historical actions 876 may include the case files associated with the performed actions. The historical actions 876 may also include information that can be used to generate a model for filtering of the related assets. The information may include classification of the asset such as assault, robbery, or speeding.

The asset bucket window module 878 may include the identification of the window that is associated with the asset bucket, identifications of other windows that are associated with non-selected assets, identification of sub-windows or sub-panes in the asset bucket such as a pane that may be associated with the related asset 159, and the like. In some embodiments, the controller component 846 may use the asset bucket module 878 to monitor the activities on a device user interface.

Example Implementation—Monitoring Activities in Asset Bucket Window

Figure 9:
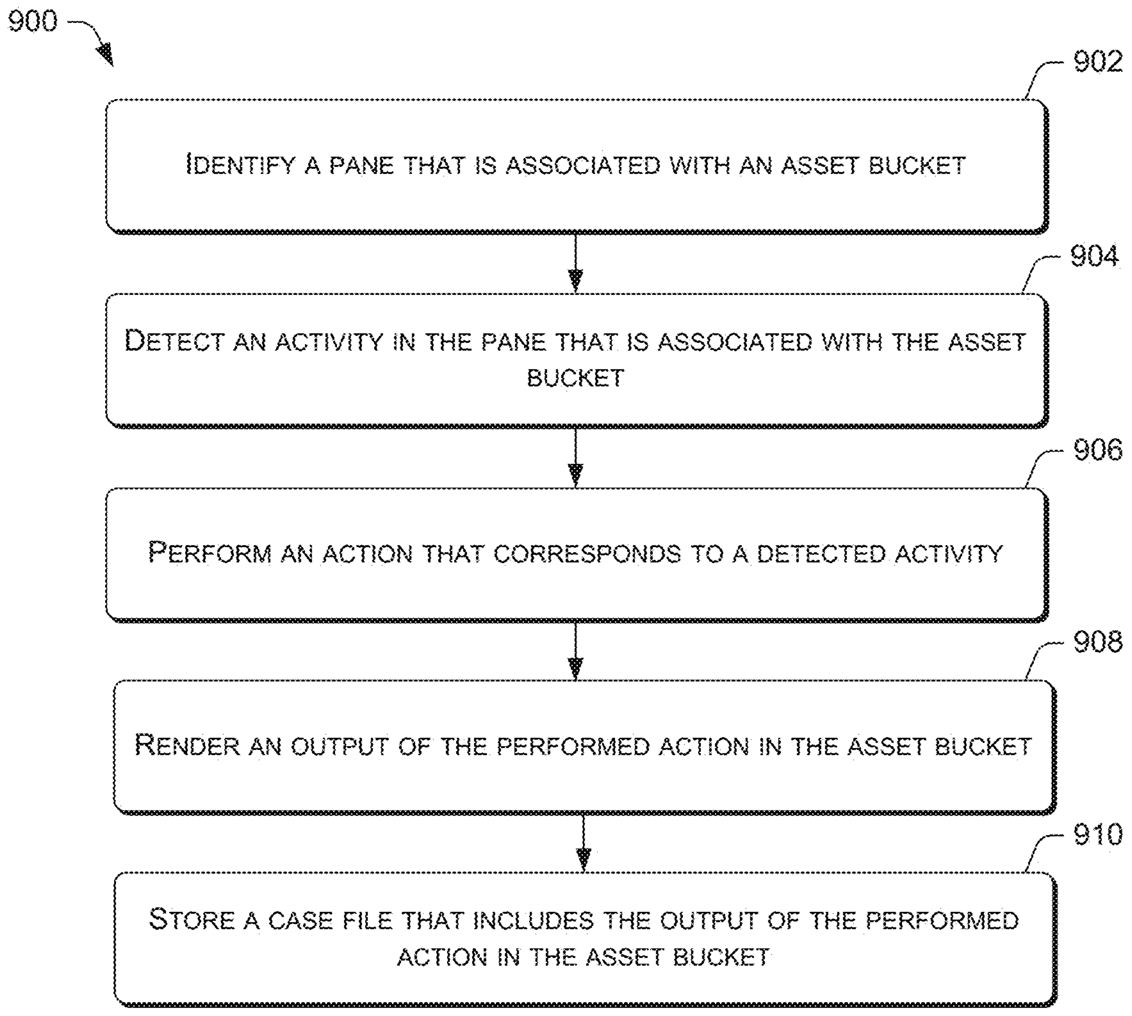
FIG. 9 is a flow diagram that depicts a methodological implementation of at least one aspect of the techniques for implementing an asset bucket that can be used to process selected one or more assets from other windows or panes.

FIG. 9 is a flow diagram 900 that depicts a methodological implementation of at least one aspect of the techniques for implementing an asset bucket that can be used to process selected one or more assets from other windows or panes. In the following discussion of FIG. 9, continuing reference is made to the elements and reference numerals shown in and described with respect to the NOC server 110 and NOC server 800 of FIGS. 1 and 8, respectively. Further, certain operations may be ascribed to particular system elements shown in previous figures. However, alternative implementations may execute certain operations in conjunction with or wholly within a different element or component of the system(s). Furthermore, to the extent that certain operations are described in a particular order, it is noted that some operations may be implemented in a different order to produce similar results.

At block 902, the NOC server 110 may identify a window that is associated with an asset bucket. In one embodiment, a user device interface may render multiple windows and/or panes for viewing, editing of files, searching of items, etc. Each of these windows or panes may be associated with corresponding identifications. In this embodiment, an asset bucket such as the asset bucket 157 may be associated with a particular window or panes so that the NOC server 110 may monitor activities that the user may be performing on the asset bucket.

At block 904, the NOC server 110 may detect an activity in the pane that is associated with the asset bucket. In one embodiment, the pane that is associated with the asset bucket may include a persistent working space where different assets from different sources may be selected and processed without altering configurations of the assets in the in the sources. In this embodiment, the NOC server 110 may monitor the activation in the asset bucket continuously, at time interval, or upon a detection of a triggering event.

In one example, the activity may include dragging and releasing an asset from the asset selections 155 to the asset bucket. In another example, the activity may include providing a link to a location in memory of the inputted asset. In another example, the activity may include hovering of a cursor to different selected asset thumbnails, and so on.

At block 906, the NOC server 110 may perform an action that corresponds to a detected activity. In one embodiment, the detected activity in the asset bucket may be associated with pre-defined rules or user-defines rule that can define the corresponding action to be performed.

For example, the activity may include dragging and releasing of an asset from the asset selections 155 to the asset bucket. In this example, the NOC server 110 may monitor a perimeter of the asset bucket and use the perimeter of the asset bucket to detect the activity of dragging and releasing of the asset in the asset bucket. Here, the NOC server 110 may implement a rule that can indicate a selection of the asset, copying of the asset from a folder window to the asset bucket, and the like.

In another example, the activity may include adding of a link, annotation, category, and/or classification to a selected asset. In this example, the NOC server 110 may monitor the adding of the link, annotation, category, and/or classification to the selected asset and implement the rules that define an action for searching related assets based on the added link, annotation, category, and/or classification.

In another example, the activity may include hovering over different asset thumbnails in the asset selections 155. In this example, the NOC server 110 may monitor the hovering on the asset thumbnail and render temporarily in the asset bucket window the assets that can be related to the asset thumbnail.

In another example, the activity may include searching of assets that are related to the selected asset. In this example, the NOC server 110 may monitor a search request based on a particular feature of the selected asset and use the corresponding thresholds to search for the related assets.

At block 908, the NOC server 110 may render an output of the performed action in the asset bucket. In one embodiment, the rendered output may include displaying of the related assets based on a particular feature or search request. For example, the first data record 440 may be representative of an output that indicates the one or more assets that are identified to be related to the selected asset based on a particular feature of the selected asset. The particular feature, for example, may include a geolocation proximity of the one or more assets to the geolocation of the selected asset. In another example, the second data record 442 may be representative of another output that indicates the one or more assets that are identified to be related to the selected asset based on another feature of the selected asset. The other feature, for example, may include temporal proximity of the one or more assets to the timestamp associated with the selected asset.

At block 910, NOC server 110 may store a case file that includes the output of the performed action in the asset bucket. In one embodiment, the output of the performed actions may be represented by a case file in the case file module 142. The case file may include a heading, identification of the selected or related assets, actions performed on these assets, configurations of the assets after the performance of the actions, and/or other information related to performance of the actions on the selected assets and/or related assets. In one example, the configurations of the assets after the performance of the actions may include a shortened length of recorded video, annotated audio, and the like. Here, the case file module 142 may support creation of a new case file, integration of the new case file to another case file, and/or updating of an old case file that is associated with the performed actions.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more computer-readable storage media collectively storing computer-executable instructions that, upon execution, cause one or more processors to collectively perform operations comprising:

detecting a selection of an asset in an asset bucket;

determining information associated with the selected asset;

searching one or more related assets that correspond to the information associated with the selected asset;

rendering the one or more related assets in the asset bucket, wherein rendering the one or more related assets comprises displaying the related asset, based on the information, the information comprising a geolocation proximity or a temporal proximity associated with the selected asset;

performing an action on at least one of the selected asset or the one or more related assets; and storing an output of the performed action over the at least one of the selected asset or the one or more related assets.

2. The one or more computer-readable storage media of claim 1, wherein searching the one or more related assets comprises:

determining that the one or more related assets are related to the selected asset based on the geolocation proximity of the one or more related assets to a geolocation of the selected asset.

3. The one or more computer-readable storage media of claim 1, wherein searching the one or more related assets comprises:

determining that the one or more related assets are related to the selected asset based on the temporal proximity of the one or more related assets to a timestamp of the selected asset.

4. The one or more computer-readable storage media of claim 1, wherein the selection of the asset in the asset bucket comprises:

detecting a dragging of the asset from a window to a pane, wherein the window is associated with an asset selections folder, and the pane is associated with the asset bucket.

5. The one or more computer-readable storage media of claim 4, wherein the asset selections folder comprises a plurality of assets that are stored in a database or received from a third-party server.

6. The one or more computer-readable storage media of claim 1, wherein the selection of the asset in the asset bucket comprises an opening of the asset in the asset bucket.

7. The one or more computer-readable storage media of claim 1, wherein the information is first information, and wherein the selection of the asset in the asset bucket comprises detecting an input of second information into the asset bucket, the second information being configured to identify the asset.

8. The one or more computer-readable storage media of claim 1, wherein storing the output of the performed action comprises:

generating a case file that comprises the output of the performed action in the asset bucket, the case file comprising at least one of an identification of the selected asset or the one or more related assets, a record of the performed action, or a configuration of the selected asset or the one or more related assets.

9. The one or more computer-readable storage media of claim 8, wherein the configuration comprises at least one of following operations:

generating a shortened length of the selected asset or the one or more related assets; or generating an annotation on the selected asset or the one or more related assets.

10. The one or more computer-readable storage media of claim 1, wherein performing the action on the at least one of the selected asset or the one or more related assets comprises performing at least one of following operations:

tagging the one or more related assets to the selected asset;

integrating the one or more related assets with the selected asset; or initiating monitoring of the asset bucket.

11. A computer-implemented system, comprising:

one or more processors; and a memory comprising instructions that are executable by the one or more processors to perform operations comprising:

displaying a window that is associated with an asset selections folder, the asset selections folder comprising a plurality of assets;

displaying a pane that is associated with an asset bucket;

receiving a selection of one of the plurality of assets from the window to the pane; and displaying one or more related assets associated with the selected asset based on information associated with the selected asset, the information comprising a geolocation proximity or a temporal proximity of the one or more related assets to the selected asset, wherein the one or more related assets are searched using one or more thresholds associated with the information, the one or more thresholds being used to determine a relevance of the one or more related assets to the selected asset.

12. The computer-implemented system of claim 11, wherein the selection of the one of the plurality of assets comprises a dragging of the one of the plurality of assets from the window to the pane.

13. The computer-implemented system of claim 11, wherein the selection of the one of the plurality of assets comprises an opening of the one of the plurality of assets in the window.

14. The computer-implemented system of claim 11, wherein the selection of the one of the plurality of assets comprises an input of a link associated with the one of the plurality of assets in the pane.

15. The computer-implemented system of claim 11, wherein the plurality of assets are stored in a database or received from a third-party server.

16. The computer-implemented system of claim 11, wherein the operations further comprise triggering an event for monitoring the asset bucket.

17. A computer-implemented system, comprising:

a server implemented by one or more processors and configured to:

receive a search request from a user device;

search one or more related assets by using a geolocation threshold, when the search request comprising searching of the one or more related assets based on a geolocation feature associated with a selected asset;

search the one or more related assets by using a temporal threshold, when the search request comprising searching of the one or more related assets based on a temporal feature associated with the selected asset; and render the one or more related assets in an asset bucket based on the search request, wherein the geolocation threshold or the temporal threshold is used to determine a relevance of the one or more related assets to the selected asset.

18. The computer-implemented system of claim 17, wherein the geolocation feature comprises a geolocation proximity of the one or more related assets to a geolocation of the selected asset.

19. The computer-implemented system of claim 17, wherein the temporal feature comprises a temporal proximity of the one or more related assets to a timestamp of the selected asset.

20. The computer-implemented system of claim 17, wherein the server is further configured to:

generate a case file that store the one or more related assets in the asset bucket.

* * * * *